US00RE34497E

United States Patent [19]

Blanks

[11] E Patent Number: Re. 34,497

[45] Reissued Date of Patent: Jan. 4, 1994

[54] LOW DIFFUSION DISK DRIVE BREATHER VENT

[75] Inventor: John B. Blanks, Edmond, Okla.

[73] Assignee: Magnetic Peripherals, Inc., Minneapolis, Minn.

[21] Appl. No.: 359,767

[22] Filed: May 31, 1989

Related U.S. Patent Documents

Reissue of:

[64] Patent No.: 4,751,594
Issued: Jun. 14, 1988
Appl. No.: 865,698
Filed: May 22, 1986

[51] Int. Cl.[5] ..... G11B 33/14
[52] U.S. Cl. ..... 360/97.02
[58] Field of Search ..... 360/86, 97.02, 97.03, 360/97.04, 137, 102, 103, 133, 135; 236/44; 369/75.1, 292; 55/337; 220/371, 373, 374

[56] References Cited

U.S. PATENT DOCUMENTS

| | | | |
|---|---|---|---|
| 3,921,849 | 11/1975 | Fernberg et al. | 220/373 X |
| 4,036,393 | 7/1977 | Neiman | 220/374 X |
| 4,594,626 | 6/1986 | Frangesh | 360/97 |
| 4,599,670 | 7/1986 | Bolton | 360/137 |
| 4,620,248 | 10/1986 | Gitzendanner | 360/97 |
| 4,631,620 | 12/1986 | Oishi et al. | 360/133 |
| 4,633,349 | 12/1986 | Beck et al. | 360/98 |
| 4,642,715 | 2/1987 | Ende | 360/97 |

FOREIGN PATENT DOCUMENTS

| | | | |
|---|---|---|---|
| 57-105872 | 7/1982 | Japan | 360/133 |
| 59-33683 | 2/1984 | Japan | 360/97 |

*Primary Examiner*—Andrew L. Sniezer
*Attorney, Agent, or Firm*—Edward P. Heller, III; Bill D. McCarthy

[57] ABSTRACT

[A vent cap has] *A low diffusion disk drive breather vent for communicating air between the interior and the exterior of a sealed disk drive housing through a vent passageway,* a long, narrow air communication passage [covering the vent outlet of a sealed disk drive. The passage reduces] *provided to reduce* diffusion of water vapor [into the disk drive] *through the passage.*

24 Claims, 1 Drawing Sheet

LOW DIFFUSION DISK DRIVE BREATHER VENT

Matter enclosed in heavy brackets [ ] appears in the original patent but forms no part of this reissue specification; matter printed in italics indicates the additions made by reissue.

BACKGROUND OF THE INVENTION

1. Field of the Invention.

The invention relates to sealed disk drives and means to reduce humidity inside the drive.

2. Brief Description of the Prior Art.

The best prior art known to Applicant is shown in Ser. No. 646,537 filed Sep. 4, 1984, now U.S. Pat. No. 4,620,248 granted Oct. 28, 1986 and assigned to the present assignee. Applicant incorporates by reference the contents of this application.

U.S. Pat. No. 4,620,248 discloses and claims a relatively long narrow tube communicating between outside air and the interior of a sealed disk drive. The tube, so constructed, allows pressure equalization between the inside and outside of the housing during disk drive operation, but also retards water vapor diffusion into the housing. Humidity increases friction, particularly static friction, between the head and the magnetic surface, which undesirably reduces disk/head life.

SUMMARY OF THE INVENTION

The invention comprises a vent cap having, or forming, a long narrow communication passage between the vent and the outside air of a sealed disk drive. The long, narrow passage allows pressure equalization while retarding water vapor diffusion into the sealed drive.

DETAILED DESCRIPTION

Figure 1:
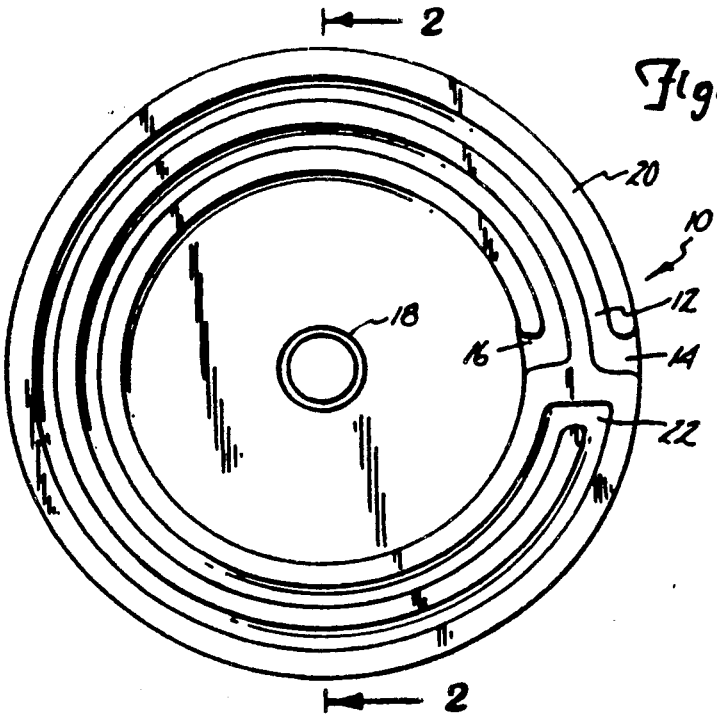
FIG. 1 is a plan view of the interior side of the cap.
Figure 3:
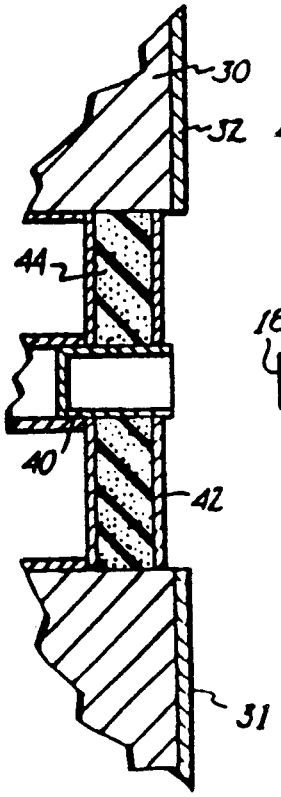
FIG. 3 is the vent outlet and filter of a sealed drive.
Figure 2:
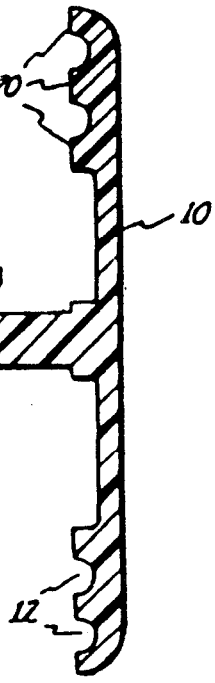
FIG. 2 is a cross section of the cap along 2—2 of FIG. 1.

FIG. 1 shows a plan view of the preferred vent cap 10. The cap includes ridges 20 which form a hollow groove 12 communicating between an inlet 14 and an outlet 16. The groove 12 comprises a half cylinder as can better be seen in FIG. 2. Mounted at the center of cap 10 is attachment boss 18, which is preferably threaded, for attaching cap 10 to vent outlet 30 (FIG. 3) *of a sealed disk drive housing 31;* via a correspondingly threaded bore 40. *The sealed disk drive housing 31 (only a portion being shown in FIGS. 3 and 4) has a disk (not shown) mounted therein.* When *the cap 10 is* mounted on the vent outlet 30, ridges 20 press against a gasket 32 mounted about the vent passageway 42 making an airtight seal therewith so that the only avenue for air to communicate between the outside air and the vent passageway 42 is through inlet 14, groove 12 and outlet 16. Also shown in FIG. 3 is a filter 44 for filtering dust out of the air which may enter vent passageway 42. Passageway 42 communicates to the interior of a sealed disk drive (not shown).

As can be seen from FIG. 1, groove 12 tracks the curvature of the circular cross sectional cap and doubles back on itself at elbow 22. This provides for a long path relative to the narrow cross section of the path between inlet 14 and outlet 16. This long, narrow path provides for pressure equalization during drive operation while retarding and reducing water vapor ingress.

In the following discussion, groove 12 is essentially a tube. It can be shown that the pressure differential through a tube is proportional to the length of the tube divided by the fourth power of its internal diameter (bore):

$$\Delta P \approx 1/d^4$$

On the other hand, the diffusion mass flow rate of water vapor through dry air in a tube is proportional to the square of the internal diameter (bore) of the tube divided by its length:

$$\Delta Q \approx d^2/l$$

It is desirable to maintain both the pressure differential, $\Delta P$, and the mass flow rate of water vapor, $\Delta Q$, as low as possible. It is evident that for a given length of tube, doubling the diameter will reduce the pressure differential by a factor of sixteen but will increase the mass flow rate of water vapor by a factor of only four. Conversely, lengthening a tube will increase the pressure differential and decrease the mass flow rate of water vapor in equal proportions. Therefore, for a given set of parameters associated with a given tube, if the length is increased by sixteen-fold and the diameter is doubled, the mass flow rate of water vapor by diffusion will be decreased by a factor of four while the pressure differential is unchanged.

It is evident that the tube should be as long as practical and have a diameter great enough as to not create a serious pressure differential. Further, it should have a bore large enough that the effects of [surfaces] *surface* tension and friction between air and water flowing in the tube and the surface of the tube are not [significantly] *significant and the flow of air and water vapor is substantially* laminar, and the tube should be long enough as to minimize the mass flow rate of water vapor through the tube. The tube must not be a capillary tube.

Assuming a maximum rate of air expulsion of 5 cubic inches per hour due to thermal excursions of the disk drive, to maintain a pressure differential smaller than 0.1 psi, a tube 10 inches in length should have a bore no smaller than 0.011 inch; a tube 20 inches in length should have a bore no smaller than 0.013 inch. Tubes with bores greater than minimum may be used, recognizing that a sacrifice of water vapor diffusion will occur.

In the preferred embodiment, cap 10 is 0.875 [inches] *inch* in diameter. Groove 12 is 0.030 [inches] *inch* in diameter, and when ridges 20 are pressed against gasket 32, the resulting passageway is approximately 0.0006 square [inches] *inch* in cross section. The length of the groove is approximately 4.9 inches.

It is understood that a passage connecting the inlet 14 with outlet 16 and formed entirely within cap 10 is also within the scope of the present invention.

Figure 4:
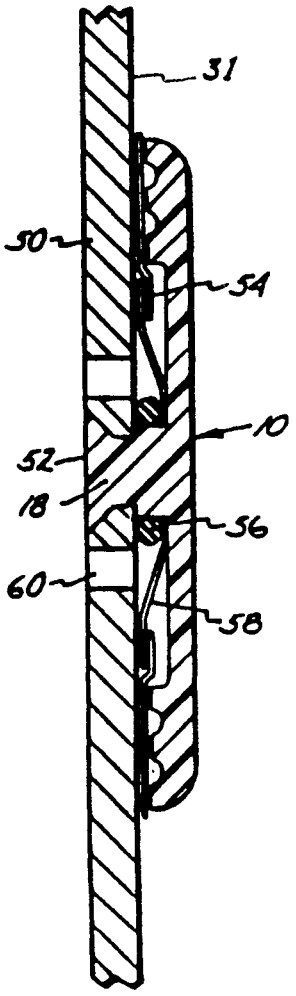
FIG. 4 is an alternative cap/vent mounting [arrangemnt] *arrangement.*

FIG. 4 shows an alternate preferred embodiment in which cap 10 is mounted on a top cover 50 of a sealed disk drive about the opening of a breather vent comprised of a plurality of inlet holes 60. In this embodiment, the boss 18 is inserted into a corresponding bore in the top cover 50 and heat staked to form an expanded end 52 which holds the cap 10 on the top cover 50. The airtight seal is maintained by circular adhesive tape 54, which is adhesive on both sides. The cap presses against the tape, forcing the tape to press against the top cover. The groove 12 permits air ingress and egress. The tape 54 extends inwardly to cover an outer circumferential portion of a circular filter 58 and held in against the top cover 50. The inner circumferential portion of this filter is held against cap 10 at boss 18 by O-ring 56. By this arrangement, outside air reaching the interior of cap 10 must pass through filter 58 to reach the air inlet holes 60 of the vent.

I claim:

1. [A] *In an* apparatus for communicating air between the interior and exterior of a sealed disk drive housing while reducing communication of water vapor between the interior and exterior of said disk drive housing, *said disk drive housing having a disk drive mounted in the interior thereof, the improvement* comprising:

[a sealed disk drive housing having an interior and an exterior;]

[a disk drive mounted in the interior of said housing;]

a vent outlet mounted on said sealed disk drive housing and having a passageway communicating between the interior and exterior of said sealed disk drive housing;

a vent cap having exterior and interior surfaces, said cap being mounted over the vent outlet with the interior surface facing said vent outlet passageway;

means for forming an airtight seal between the [exterior surface of the] cap and the vent passageway; and a [long, narrow] passage communicating between the exterior and interior surfaces of said cap, the length and cross section of the passage being arranged to provide airpressure equalization and reduced water vapor communication between the interior and exterior of the housing, the passage [generally tracking the circumference of the cap and] having a length [at least equal to the circumference of the cap] and a cross section minimum determined by the length of the passage and a predetermined minimum pressure differential between the interior and exterior of the disk drive housing at a predetermined airflow rate, the passage length further being long enough such that such minimum cross section is large enough that the flow of air and water vapor in the passage is essentially laminar.

2. *In an* [Apparatus] *apparatus*pparatus for communicating air between the interior and exterior of a sealed disk drive housing while reducing communication of water vapor between the interior and exterior of said disk drive housing, *said disk drive housing having a disk drive mounted in the interior portion thereof, the improvement* comprising:

[a sealed disk drive housing having an interior and an exterior;]

[a disk drive mounted in the interior of said housing;]

a vent outlet mounted on said sealed disk drive housing and having a passageway communicating between the interior and exterior of said sealed disk drive housing;

a gasket mounted about the passageway; and a vent cap having ridges forming a [long, narrow] groove between an inlet opening and an outlet opening, said cap being mounted on said vent outlet with said ridges pressed against said gasket and forming an airtight seal therewith such that the groove provides a communicating passage between the vent passageway and the exterior of said disk drive housing, the length and cross section of the groove being arranged to provide air-pressure equalization and reduced water vapor communication between the interior and exterior of the housing, the passage [generally tracking the circumference of the cap and having a length at least equal to the circumference of the cap and a cross section minimum determined by the length of the passage and] *having a length and cross section so as to provide* a predetermined minimum pressure differential between the interior and exterior of the disk drive housing at a predetermined airflow rate, the passage length [further] being long enough such that such minimum cross section is large enough that the flow of air and water vapor in the passage is essentially laminar.

3. *In an* [Apparatus] *apparatus*pparatus according to claim 1 wherein the cap is circular and the [long, narrow] passage follows the curvature of the cap.

4. *In an* [Apparatus] *apparatus*according to claim 3 wherein said [long, narrow] passage further includes at least one elbow wherein the passage doubles back on itself.

5. *In an* [Apparatus] *apparatus*according to claim 2 wherein the cap is circular and the [long, narrow] groove follows the curvature of the cap.

6. *In an* [Apparatus] *apparatus*according to claim [3] *2* wherein said [long, narrow] groove further includes at least one elbow wherein the passage doubles back on itself.

7. *In an* [Apparatus] *apparatus*for communicating air between the interior and exterior of a sealed disk drive housing while reducing communication of water vapor between the interior and exterior of said disk drive housing, *said disk drive housing having a disk drive mounted in the interior thereof, the improvement* comprising:

[a sealed disk drive housing having an interior and an exterior;]

[a disk drive mounted in the interior of said housing;]

a vent outlet mounted on said sealed disk drive housing and having at least one passageway communicating between the interior and exterior of said sealed disk drive housing;

[a] sealing means mounted on said vent outlet and enclosing the passageway;

a vent cap having ridges forming a [long, narrow] groove between an inlet opening and an outlet opening, the cap mounted on said vent outlet with said ridges pressed against said sealing means and forming an airtight seal therewith such that the groove provides a communicating passage between the vent passageway and the exterior of the housing, the length and cross section of the groove being arranged to provide air-pressure equalization and reduced water vapor communication between the interior and exterior of the housing, the passage [generally tracking the circumference of the cap and] having a length at least equal to the circumference of the cap and a cross section minimum determined by the length of the passage and a predetermined minimum pressure differential between the interior and exterior of the disk drive housing at a predetermined airflow rate, the passage length further being long enough such that such minimum cross section is large enough that the flow of air and water vapor in the passage is essentially laminar.

8. *In an* [Apparatus] *apparatus*according to claim 7 wherein the sealing means comprises double-sided adhesive tape.

9. *In an* [Apparatus] *apparatus*according to claim 7 *the improvement* further [including] *comprising:* a central boss mounted on said cap;

an O-ring mounted about said boss; and a filter captured at an inner portion between the O-ring and the cap.

10. *In an* [Apparatus] *apparatus*according to claim 8 *the improvement* further [including] *comprising:* a central boss mounted on said cap;

an O-ring mounted about said boss; and a filter captured at an inner portion between the O-ring and the cap and at an outer portion between said double-sided adhesive tape and said disk drive.

11. *In an* [Apparatus] *apparatus*according to claim 7 wherein the cap is circular and the [long, narrow] groove follows the curvature of the cap.

12. *In an* [Apparatus] *apparatus*according to claim 11 wherein said [long, narrow] groove further includes at least one elbow wherein the passage doubles back on itself.

*13. In an apparatus for communicating air between the interior and exterior of a sealed disk drive housing while reducing communication of water vapor between the interior and exterior of the disk drive housing, said disk drive housing having a disk drive mounted in the interior thereof, the improvement comprising:*

*vent means mounted on the sealed disk drive housing for providing communication between the interior and exterior of the sealed disk drive housing; and*

*air passage means for equalizing air-pressure between the interior and exterior of the sealed disk drive housing and for reducing water vapor communication between the interior and exterior thereof, the air passage means comprising a passage communicating between the exterior of the sealed disk drive housing and the vent means, the passage having a cross section minimum determined by the length of the passage and a predetermined minimum pressure differential between the interior and exterior of the sealed disk drive housing at a predetermined airflow rate, the passage length and cross section determined to effect essentially laminar flow of air and water vapor therethrough.*

*14. In an apparatus according to claim 13 wherein the vent means comprises:*

*a vent outlet mounted on the sealed disk drive housing;*

*a vent cap; and*

*wherein the passage of the air passage means comprises a groove extending between an inlet opening and an outlet opening, the vent cap mounted on the vent outlet such that the passage is formed therebetween.*

*15. In an apparatus of claim 14 the improvement comprising:*

*gasket means disposed between the sealed disk drive housing and the vent cap so as to be disposed adjacent the ridges of the air passage means.*

*16. In an apparatus of claim 15 wherein the vent cap is circular and wherein the passage of the air passage means follows the curvature of the cap.*

*17. In an apparatus of claim 16 wherein the passage includes at least one elbow wherein said passage doubles back on itself.*

*18. In an apparatus of claim 13 wherein the vent means further comprises:*

*filter means for filtering air communicated to the interior of the sealed disk drive housing.*

*19. In a disk drive apparatus in which air is communicated between the interior and the exterior of a sealed disk drive housing having a disk drive mounted therein, improvement comprising:*

*vent means for providing air communication between the interior and exterior of the sealed disk drive housing; and*

*air passage means communicating with the vent means for equalizing air-pressure between the interior and exterior of the sealed disk drive housing and for reducing water vapor communication between the interior and exterior thereof, the air passage means comprising a passage communicating between the exterior of the sealed disk drive housing and the vent means, the passage having a cross section minimum determined by the length thereof so that a predetermined minimum pressure differential is established between the interior and exterior of the sealed disk drive housing at a predetermined airflow rate, the length and cross section of the passage determined to effect laminar air and water vapor flow therethrough.*

*20. In a disk drive according to claim 19 wherein the vent means comprises:*

*a vent outlet supported by the sealed disk drive housing;*

*a vent cap; and*

*wherein the passage of the air passage means comprises a groove formed between the vent cap and the sealed disk drive housing and which extends between an inlet opening and an outlet opening.*

*21. In a disk drive apparatus of claim 20 the improvement further comprising:*

*gasket means disposed between the sealed disk drive housing and the vent cap ridges for forming an airtight seal.*

*22. In a disk drive apparatus of claim 21 wherein the vent cap is circular, and wherein the passage follows the curvature of the cap.*

*23. In a disk drive apparatus of claim 22 wherein the passage includes at least one elbow wherein said passage doubles back on itself.*

*24. In a disk drive apparatus of claim 23 wherein the improvement further comprises:*

*filter means for filtering air communicated to the interior of the sealed disk drive housing.*

* * * * *

UNITED STATES PATENT AND TRADEMARK OFFICE

CERTIFICATE OF CORRECTION

PATENT NO. : Re. 34,497
DATED : January 4, 1994
INVENTOR(S) : John B. Blanks

It is certified that error appears in the above-indentified patent and that said Letters Patent is hereby corrected as shown below:

Column 3, line 53, delete "*apparatus*pparatus" and substitute therefor --*apparatus*--;

Column 4, line 24, delete "*apparatus*pparatus" and substitute therefor --*apparatus*--;

Column 4, line 27, delete "*apparatus*according" and substitute therefor --*apparatus* according--;

Column 4, line 31, delete "*apparatus*according" and substitute therefor --*apparatus* according--;

Column 4, line 34, delete "*apparatus*according" and substitute therefor --*apparatus* according--;

Column 4, line 38, delete "*apparatus*for" and substitute therefor --*apparatus* for--;

Column 5, line 9, delete "*apparatus*according" and substitute therefor --*apparatus* according--;

Column 5, line 12, delete "*apparatus*according" and substitute therefor --*apparatus* according--;

Column 5, line 18, delete "*apparatus*according" and substitute therefor --*apparatus* according--;

UNITED STATES PATENT AND TRADEMARK OFFICE

CERTIFICATE OF CORRECTION

PATENT NO. : Re. 34,497
DATED : January 4, 1994
INVENTOR(S) : John B. Blanks

It is certified that error appears in the above-indentified patent and that said Letters Patent is hereby corrected as shown below:

Column 5, line 26, delete "*apparatus*according" and substitute therefor --*apparatus* according--;

Column 5, line 29, delete "*apparatus*according" and substitute therefor --*apparatus* according--;

Column 6, line 39, after "*drive*" insert --*apparatus*--.

Signed and Sealed this

Twentieth Day of June, 1995

Bruce Lehman

*Attest:*

BRUCE LEHMAN

*Attesting Officer*

*Commissioner of Patents and Trademarks*